US012056054B2

(12) United States Patent
Wang et al.

(10) Patent No.: US 12,056,054 B2
(45) Date of Patent: Aug. 6, 2024

(54) DYNAMIC GROWTH OF DATA CACHES USING BACKGROUND PROCESSES FOR HASH BUCKET GROWTH

(71) Applicant: VMware LLC, Palo Alto, CA (US)

(72) Inventors: Wenguang Wang, Santa Clara, CA (US); Yanxing Pan, San Jose, CA (US); Junlong Gao, Santa Clara, CA (US); Mounesh Badiger, Bangalore (IN); Eric Knauft, San Francisco, CA (US); Vamsidhar Gunturu, Cupertino, CA (US)

(73) Assignee: VMware LLC, Palo Alto, CA (US)

( * ) Notice: Subject to any disclaimer, the term of this patent is extended or adjusted under 35 U.S.C. 154(b) by 0 days.

(21) Appl. No.: 17/900,642

(22) Filed: Aug. 31, 2022

(65) Prior Publication Data

US 2024/0070080 A1 Feb. 29, 2024

(51) Int. Cl.
*G06F 12/08* (2016.01)
*G06F 12/0864* (2016.01)

(52) U.S. Cl.
CPC .. *G06F 12/0864* (2013.01); *G06F 2212/1016* (2013.01); *G06F 2212/604* (2013.01)

(58) Field of Classification Search
CPC ............. G06F 12/0864; G06F 12/0223; G06F 12/0802; G06F 3/065; G06F 3/0619; G06F 3/067; G06F 3/0631; G06F 3/0643; G06F 9/526; G06F 16/137; G06F 16/22; G06F 16/2255; G06F 16/2228; G06F 16/9014; G06F 16/9017; G06F 2212/1016; G06F 2212/604; G06F 2212/7203; G06F 7/00

See application file for complete search history.

(56) References Cited

U.S. PATENT DOCUMENTS

| 8,996,535 | B1* | 3/2015 | Kimmel | G06F 16/9014 707/747 |
| 2008/0021908 | A1* | 1/2008 | Trask | G06F 16/9014 |
| 2013/0218901 | A1* | 8/2013 | Majnemer | G06F 3/068 707/747 |
| 2017/0168936 | A1* | 6/2017 | Chandrashekar | G06F 3/0619 |
| 2018/0260324 | A1* | 9/2018 | Marathe | G06F 12/0804 |
| 2018/0341596 | A1* | 11/2018 | Teotia | G06F 12/1018 |

* cited by examiner

*Primary Examiner* — Tracy C Chan
(74) *Attorney, Agent, or Firm* — King Intellectual Asset Management (57) ABSTRACT

The disclosure describes growing a data cache using a background hash bucket growth process. A first memory portion is allocated to the data buffer of the data cache and a second memory portion is allocated to the metadata buffer of the data cache based on the cache growth instruction. The quantity of hash buckets in the hash bucket buffer is increased and the background hash bucket growth process is initiated, wherein the process is configured to rehash hash bucket entries of the hash bucket buffer in the increased quantity of hash buckets. A data entry is stored in the data buffer using the allocated first memory portion of the data cache and metadata associated with the data entry is stored using the allocated second memory portion of the metadata buffer, wherein a hash bucket entry associated with the data entry is stored in the increased quantity of hash buckets.

18 Claims, 7 Drawing Sheets

DYNAMIC GROWTH OF DATA CACHES USING BACKGROUND PROCESSES FOR HASH BUCKET GROWTH

BACKGROUND

The sizes of data caches are important factors to the performance of all modern storage systems. While a larger cache will lower the miss ratio and improve performance, the benefits will diminish as the cache size surpasses the size of the working set of data. Managing the size of data caches to maintain and/or improve performance of the associated systems during operation of those systems presents substantial challenges.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for growing a data cache using a background hash bucket growth process is described. A first memory portion is allocated to the data buffer of the data cache and a second memory portion is allocated to the metadata buffer of the data cache based on the cache growth instruction. The quantity of hash buckets in the hash bucket buffer of the metadata buffer is increased based on the cache growth instruction, and the background hash bucket growth process is initiated, wherein the process is configured to rehash at least a portion of hash bucket entries of the hash bucket buffer in the increased quantity of hash buckets. Then, a data entry is stored in the data buffer using the allocated first memory portion of the data cache and metadata associated with the data entry is stored using the allocated second memory portion of the metadata buffer, wherein a hash bucket entry associated with the data entry is stored in the increased quantity of hash buckets in the hash bucket buffer.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 7, the systems are illustrated as schematic drawings. The drawings may not be to scale.

DETAILED DESCRIPTION

Aspects of the disclosure provide a computerized method and system for expanding the storage capacity of a data cache using a background process or other parallel process to grow hash bucket data structures of the data cache without interfering with the operations of the data cache. The disclosure describes allocating memory portions to a data buffer of a data cache and a metadata buffer of the data cache when growing the data cache. Further, a quantity of hash buckets in the hash bucket buffer of the metadata buffer is increased based on the growth of the data cache and a background hash bucket growth process is initiated. The background hash bucket growth process rehashes hash bucket entries of the hash bucket buffer into the increased quantity of hash buckets in parallel with other processes that use the data cache. Then, a data entry is stored in the data buffer in the newly allocated memory portion and metadata of the data entry is stored in the metadata buffer in the newly allocated memory portion. Additionally, a hash bucket entry associated with the data entry is stored in the increased quantity of hash buckets in the hash bucket buffer.

The disclosure operates in an unconventional manner at least by performing the hash bucket entry rehashing in a background process separate from other processes using the data cache, such that the data cache can continue to be used by the other processes. The expansion of a hash bucket buffer to include more hash buckets necessarily requires that at least some of the hash bucket entries be migrated between hash buckets of the data structure. This rehashing process must at least evaluate each hash bucket entry, such that the time and processing resource requirements of the process are relatively high when the hash bucket buffer stores large quantities of hash bucket entries sorted into hash buckets. Thus, the rehashing process is performed using a background process, and access and use of the data cache during such a process is managed using synchronizing locks as described herein. The background process executes in parallel and/or simultaneously with other processes using the data cache. This use of a background process eliminates, or at least reduces, interference with other processes that use the data cache such that the performance and/or responsiveness of those other processes is improved compared to conventional cache management processes.

Further, the disclosure describes the technologically efficient expansion of data buffers and metadata buffers of a data cache, without the need for extensive migration, by assigning or reserving for each buffer of the data cache a relatively large block of address space made up of consecutive addresses. By using such consecutive address space blocks, the expansion of a data buffer of the data cache can be done "in-place", such that the allocation of additional memory space to the data buffer can be done by mapping that additional memory space to the consecutive address space reserved for that data buffer. As a result, the starting address for the data buffer does not change, eliminating any need to migrate data of the data buffer. This feature substantially reduces the computational time, memory, and processing costs that would be needed to expand a data buffer in a way that required migration of the data. Further, in some examples, the performance of such data buffer migrations interrupt or otherwise interfere with other processes that are using the data cache, decreasing the performance and/or responsiveness of those other processes. These issues are avoided by operations of the disclosure.

Additionally, the disclosure describes synchronization techniques that are configured to ensure accurate data cache usage by other processes while a growth process is active. The disclosure describes a growth flag or other indicator of the data cache that is set when a background hash bucket growth process is initiated. The indicator is checked when an operation is to be performed on the data cache. If the indicator is set, the operation tries to secure the locks of both a current hash bucket and a destination hash bucket of the hash bucket entry associated with the data entry that is the target of the operation. The use of data entry locks and the growth indicator work together to ensure that, when a hash bucket entry is not rehashed yet, a cache operation that affects the hash bucket entry will always lock the current and destination hash bucket locks correctly and accurately.

Figure 1:
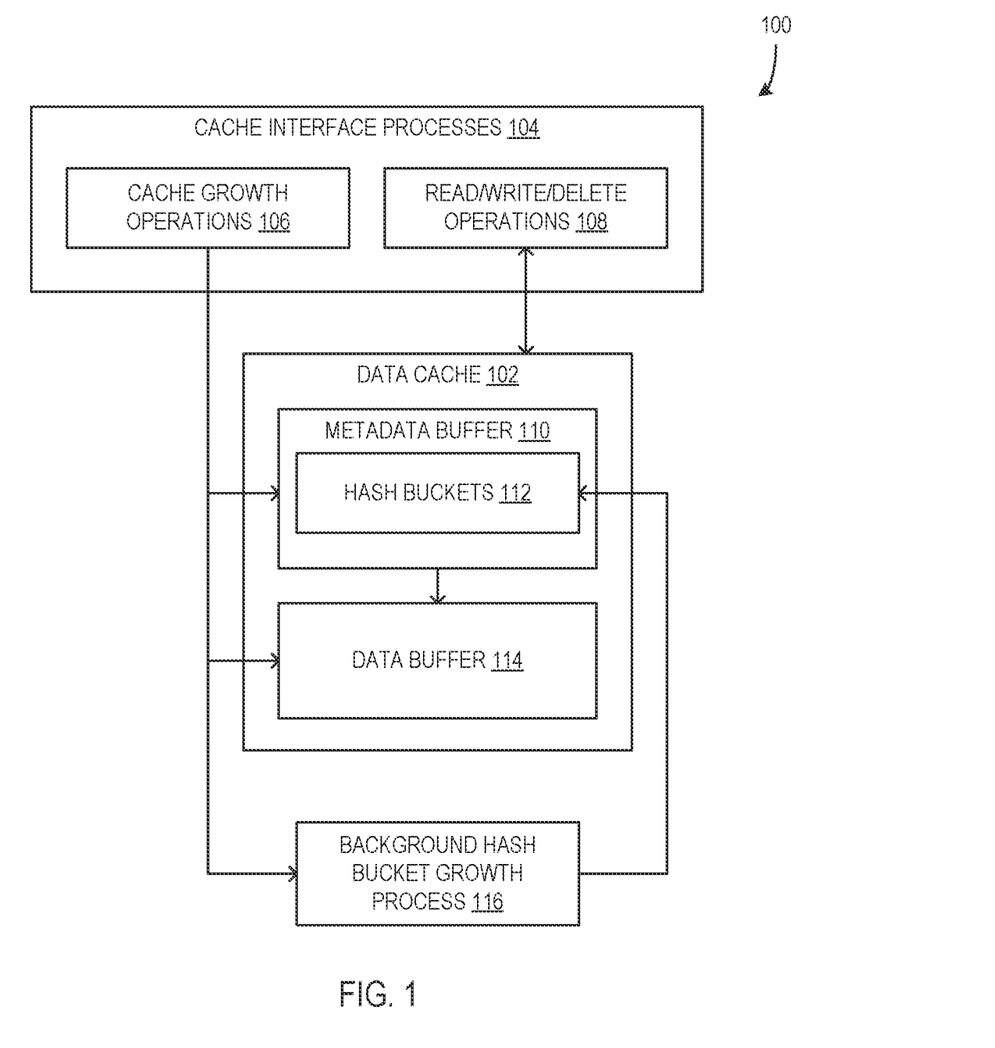
FIG. 1 is a block diagram illustrating a system configured for managing growth of a data cache using a background hash bucket growth process.

FIG. 1 is a block diagram illustrating a system 100 configured for managing growth of a data cache 102 using a background hash bucket growth process 116. The system 100 includes processes 104 that interface with the data cache 102, including processes that perform cache growth operations 106 and/or processes that perform read, write, and/or delete operations 108 on the data cache 102. Further, data cache 102 of the system includes a metadata buffer 110 including hash buckets 112 and a data buffer 114, wherein the data buffer 114 stores the data of the data cache and the metadata buffer 110 stores metadata associated with the data buffer 114 that enables the performance of the operations 106 and/or 108 on the data stored in the data buffer 114 (e.g., metadata that indicates the locations of data within the data buffer 114). The background hash bucket growth process 116 is initiated to expand and/or otherwise adjust the total quantity of hash buckets 112 in the metadata buffer 110 based on the execution of cache growth operations 106. The background hash bucket growth process 116 executes in the background with respect to the other cache interface processes 104, such that the background hash bucket growth process 116 does not interfere with the operations of the cache interface processes 104 as described herein.

As illustrated, the metadata buffer 110 is configured using a data structure that uses multiple hash buckets 112. In some examples, the metadata buffer 110 and associated hash buckets 112 are structured as a hash table in which metadata entries include hashed key values that map to records (e.g., location data of data entries within the data buffer 114). The metadata buffer 110 has a defined quantity of hash buckets 112, each of which are configured to store a finite quantity of hash bucket entries that include key values mapped to records. Hash bucket entries are sorted among the hash buckets 112 in such a way that a search for a particular hash bucket entry can used this sorting to more efficiently fine the searched-for entry. For instance, in an example, the hash buckets 112 include four hash buckets as illustrated as original buckets in FIG. 3, wherein hash bucket entries are sorted into the four hash buckets based on a remainder result obtained when dividing the hash value of the entry by four. As a result, searching for a particular hash bucket entry based on a key value includes applying the hash function to the key value and then dividing the resulting hash value by four and obtaining a remainder result. That remainder result is then used to identify one of the hash buckets 112 in which to start searching for the hash value. Thus, the maximum quantity of hash bucket entries to be searched for the target hash value is reduced to one quarter of the metadata buffer 110. Further, because the hash buckets 112 of the metadata buffer 110 are of finite sizes/capacities, in some examples, the quantity of the hash buckets 112 in the metadata buffer 110 must be increased when the capacity of the metadata buffer 110 increases. Such increases in the quantity of hash buckets 112 in the metadata buffer 110 are achieved by the background hash bucket growth process 116 as described herein.

Figure 7:
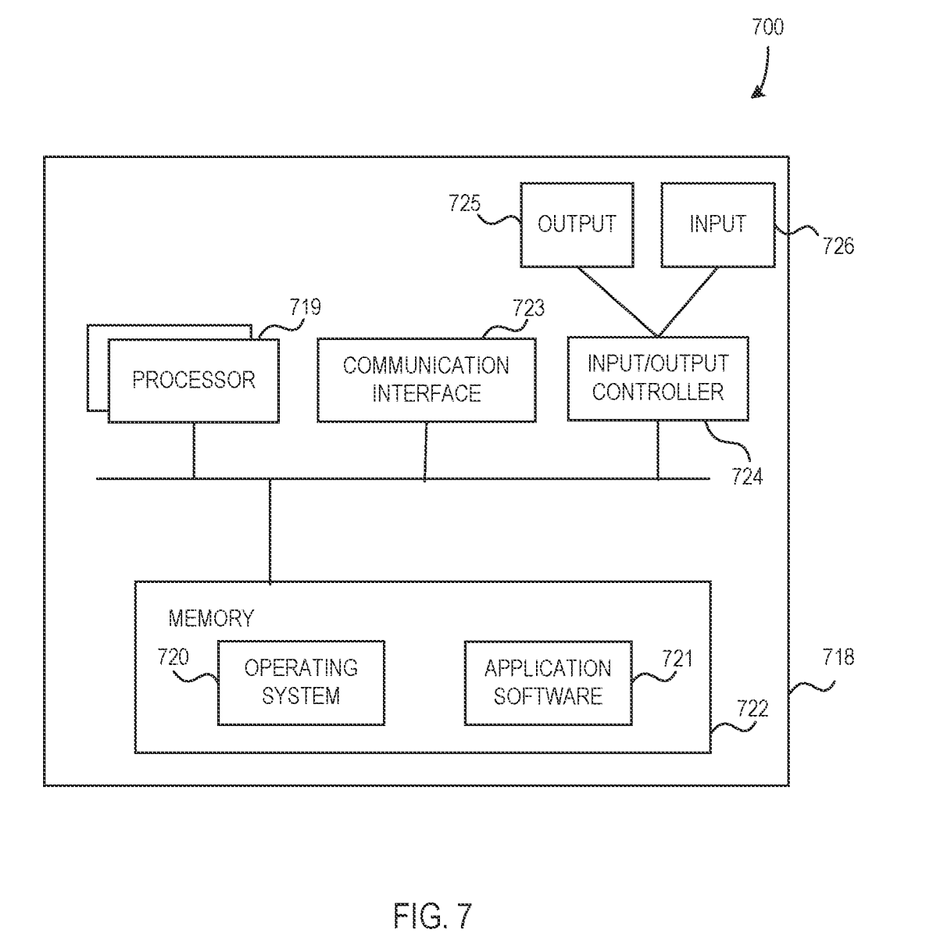
FIG. 7 illustrates an example computing apparatus as a functional block diagram.

In some examples, the system 100 includes a computing device (e.g., the computing apparatus of FIG. 7). Further, in some examples, the system 100 includes multiple computing devices that are configured to communicate with each other via one or more communication networks (e.g., an intranet, the Internet, a cellular network, other wireless network, other wired network, or the like). The entities of the system 100 are configured to be distributed between the multiple computing devices and to communicate with each other via network connections. For example, the data cache 102 is located and/or executed on a first computing device or set of computing devices while the cache interface processes 104 originate on and/or are executed on a second computing device or set of computing devices. The data cache 102 and the cache interface processes 104 are then configured to communicate with each other via a network connection as described herein. Further, in other examples, the elements of the system 100 are located on and/or executed on a plurality of distributed computing devices in various arrangements and/or organization without departing from the description.

In some examples, the data cache 102 is a data structure that is configured to store data such that the data is more quickly and/or easily accessible than it would otherwise be. For example, the data cache 102 is configured to store or cache data that is obtained from a database that has greater time and/or processing requirements for accessing data thereon. In such examples, the first time that a portion of data is accessed, it is not yet stored on the data cache 102 and so the data portion is obtained from the database, incurring the associated time and/or processing costs. However, after the data portion is obtained from the database, the data portion is stored in the data cache 102 (e.g., in the data buffer 114) and the data cache 102 is configured to enable future processes 104 that request the data portion to obtain the data portion from the data cache 102, thereby avoiding the costs associated with accessing the database.

Further, in some examples, the cache interface processes 104 are configured to interact directly with the data cache 102 and to enable other processes to interact indirectly with the data cache 102 using the cache interface processes 104. A software application or other entity requests a data portion from the system 100 by interacting with a cache interface process 104 (e.g., a read operation 108). The cache interface process 104 accesses the data cache 102 to retrieve the requested data portion from the data buffer 114 using the associated data in the metadata buffer 110.

Additionally, or alternatively, in some examples, the system 100 is part of a data system in which the data cache 102 caches data that has previously been obtained from a database, such as the database previously described. The data system is configured to receive requests for portions of data from other applications and/or other entities, wherein the requested data portions are stored in the database and/or stored in the data cache 102. The data system is configured to first determine if the requested data portion is stored in the data cache 102 using cache interface processes 104 and, if the data portion is stored in the data cache 102, the requested data portion is obtained from the data cache 102 and provided to the requesting entity. If the requested data portion is not stored in the data cache 102, the requested data portion is obtained from the database and provided to the requesting entity. Additionally, in some examples, when the requested data portion is obtained from the database, it is also stored in the data cache 102 such that future requests for that data portion can be satisfied using the cached instance of the data portion in the data cache 102.

In some examples, the system 100 is configured to perform cache growth operations 106 on the data cache 102. The system 100 performs a cache growth operation 106 on the data cache 102 when a current capacity of the data cache 102 is filled with data to a defined percentage or other threshold (e.g., the data cache 102 is grown automatically when the capacity of the data cache 102 is 80% full). Further, in some examples, the additional capacity added to the data cache 102 as a result of cache growth operations 106 is based at least in part on the current capacity of the data cache 102, such as the data cache 102 being grown by a percentage of the current capacity (e.g., the data cache 102 is grown by 10% during performance of a cache growth operation 106).

In some examples, a cache growth operation 106 is configured to expand or otherwise increase the capacity of the data cache 102 to store data, including increasing the capacity of the data buffer 114 and increasing the capacity of the metadata buffer 110 in such a way that the expanded metadata buffer 110 is sufficient to store the metadata of the expanded data buffer 114. Further, expanding the metadata buffer 110 includes expanding the capacity of the hash buckets 112, which includes increasing the quantity of hash buckets 112 in many cases. The expansion of the data buffer 114 includes increasing a quantity of cache pages used in the data buffer 114 (see the description of FIG. 2 for more details). However, increasing the quantity of hash buckets 112 requires that the entries of the hash buckets 112 be reorganized, or 'rehashed', such that they are spread between the newly increased set of hash buckets 112. This process requires some time and processing resources and, to account for those requirements, the cache growth operation 106 triggers or schedules the execution of a background hash bucket growth process 116 that performs growth operations on the hash buckets 112, including the rehashing of the hash bucket entries therein (see the description of FIG. 3 for more details).

The background hash bucket growth process 116 is configured to be executed "in the background" with respect to the cache interface processes 104, such that the performance of the process 116 does not interfere with or otherwise negatively affect the operations of the cache interface processes 104. For example, the background hash bucket growth process 116 is executed on different processing hardware than the cache interface processes 104, or the process 116 is executed on a different thread than the cache interface processes 104 using multi-threaded processing hardware.

In some examples, during the execution of the background hash bucket growth process 116, lock mechanisms, such as mutexes, semaphores, or the like, are used by the process 116 and the cache interface processes 104 to ensure that multiple processes are not accessing and/or changing a memory portion of the data cache 102 at one time. These locks are associated with data entries within the data buffer 114, with individual hash buckets 112, and/or other groups of data in the data cache 102. For example, the process 116 is configured to secure a lock of a hash bucket entry in a hash bucket, secure the locks of the current hash bucket of the hash bucket entry and the new hash bucket of the hash bucket entry after it has been rehashed, transfer the hash bucket entry from the current hash bucket to the new hash bucket, release the locks of the current hash bucket and the new hash bucket, and release the lock of the hash bucket entry. In this way, the process 116 is configured to rehash the hash bucket entries that need to be rehashed based on the growth of the data cache 102 as described herein.

Further, in some examples, during the execution of the process 116, a flag is set that indicates that the cache is being grown (e.g., a cache-growth flag). Cache interface operations 104 that are configured to change the data in the data cache 102, such as write operations, insert operations, delete operations, and/or remove operations 108, use the cache-growth flag to determine how to secure locks and perform the associated operations on data entries. For an operation 108 that is configured to change a data entry, the data entry lock is secured first. Then, the cache-growth flag is checked and, if it is set to indicate that the process 116 is active, locks for both hash buckets of the data entry are secured. Alternatively, if the cache-growth flag is not set to indicate that the process 116 is active, only the lock for the current hash bucket is secured. Once these locks are secured, the associated operation is performed on the data entry, and the secured locks are released in reverse order (e.g., the hash bucket locks are released first and then the data entry lock is released).

In some examples, lookup and/or read operations 108 are not configured to secure data entry locks first and, as a result, the performance of such a lookup operation is 'best-effort' during cache growth, such that the performance of the operation is attempted and if it does not succeed, the failure is handled by triggering a cache insert operation. For example, the data entry that was the subject of the lookup operation is found to not be present in the cache and it is then obtained and inserted into the cache by the triggered cache insert operation. In such examples, the cache insert operation is guaranteed to behave correctly with respect to the locks of the data entries and/or hash buckets as described above, such that the failed lookup operation does not affect correctness of the data cache 102.

Further, in some examples, the system 100 is configured to use a try-lock locking policy, such that when a process attempts to lock two or more buckets and fails to secure one of the buckets, any secured locks are released, enabling other processes to secure those locks and continue operations. Additionally, or alternatively, the system 100 is configured to use a locking policy that requires that data entry locks must be secured before securing and/or holding a hash bucket lock.

Additionally, or alternatively, in some examples, the data of the data cache 102 is further subdivided into different buffers. In such examples, the data buffer 114 is divided into a hot entry data buffer and a cold entry data buffer, wherein 'hot entries' are data entries that are accessed and/or otherwise used more frequently while 'cold entries' are data entries that are accessed and/or otherwise used less frequently. Further, the metadata buffer 110 is subdivided into a hot entry metadata buffer (e.g., storing metadata associated with the hot entry data), a cold entry metadata buffer (e.g., storing metadata associated with the cold entry data), an entry hash bucket buffer configured to store the hash buckets 112, a ghost keys buffer, and a ghost key hash bucket buffer. The ghost keys buffer and/or the ghost key hash bucket buffer are used to keep track of evicted cold entries to help identify long-term frequently-accessed entries.

Figure 2:
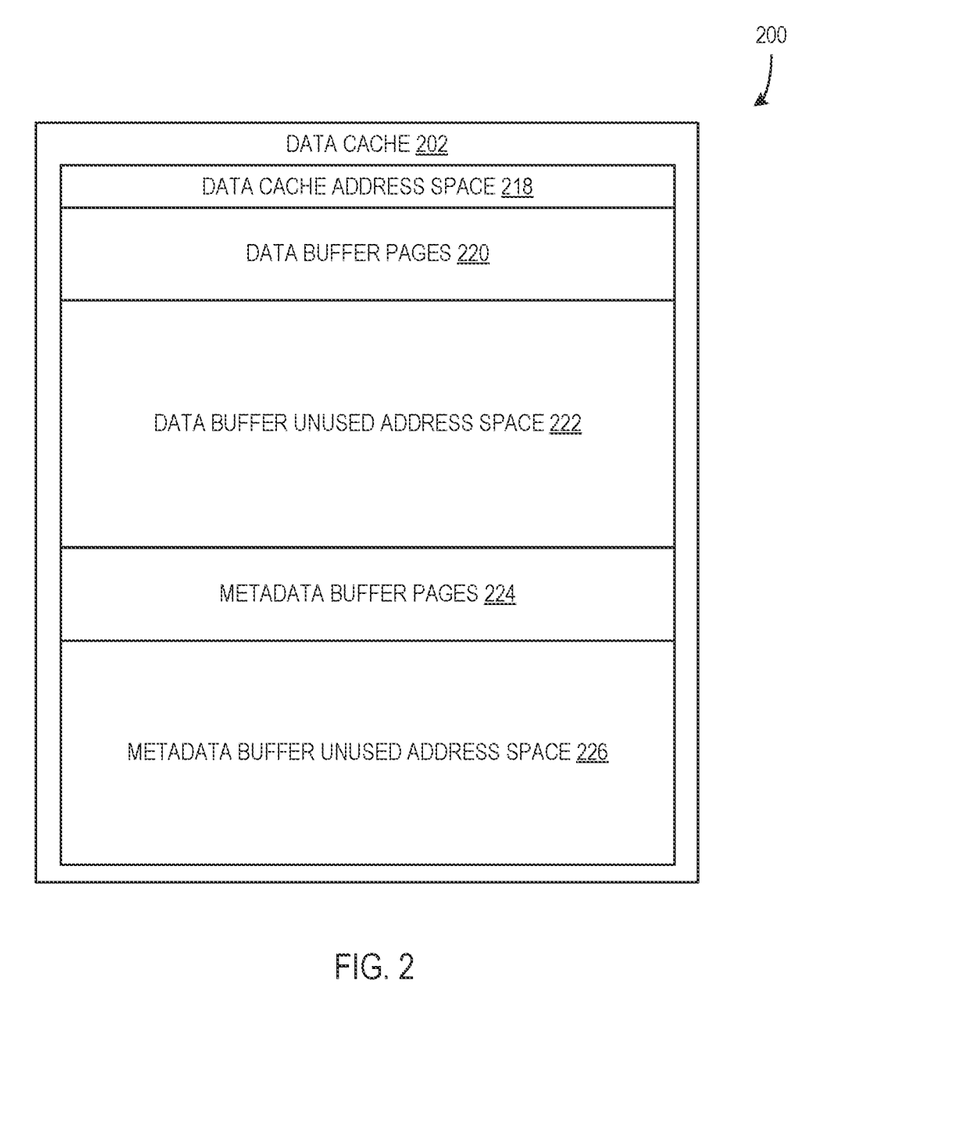
FIG. 2 is a block diagram illustrating an arrangement of address space in a data cache.

FIG. 2 is a block diagram 200 illustrating an arrangement of address space 218 in a data cache 202. In some examples, the data cache 202 is part of a system such as system 100 of FIG. 1 as described herein.

The data cache 202 is configured to include a data cache address space 218 which includes a series of address values that can be used to organize, arrange, and/or locate data that is stored in the data cache 202. In some examples, the address space 218 is reserved for the data cache 202 initially without fully allocating memory resources to the reserved address space 218. As illustrated, the data cache address space 218 includes data buffer pages 220 that have been allocated to a portion of the address space 218 and data buffer unused address space 222 for which no data pages have been allocated yet. Further, after the data buffer address space (e.g., the pages 220 and the unused address space 222), the metadata buffer address space, including metadata buffer pages 224 and metadata buffer unused address space 226, is allocated.

In some examples, large portions of continuous address space are reserved for each of the data buffer and the metadata buffer, such that the growth of the data buffer and the metadata buffer can be performed by expanding the buffers 'in place' by expanding into the continuous address space that has already been reserved for them. As a result, the starting addresses of the cache buffers do not change during growth operations, which helps reduce or eliminate the need to migrate data of the buffers during those growth operations.

Further, in examples where the data buffer and/or the metadata buffer are subdivided into other different buffers (e.g., the hot entry data buffer, cold entry data buffer, hot entry metadata buffer, cold entry metadata buffer, entry hash bucket buffer, ghost keys buffer, and ghost key hash bucket buffer as described herein), portions of continuous address space are reserved for each buffer subdivision, such that each buffer subdivision can be grown into the associated reserved continuous address space without requiring those buffer subdivisions to be migrated.

Figure 3:
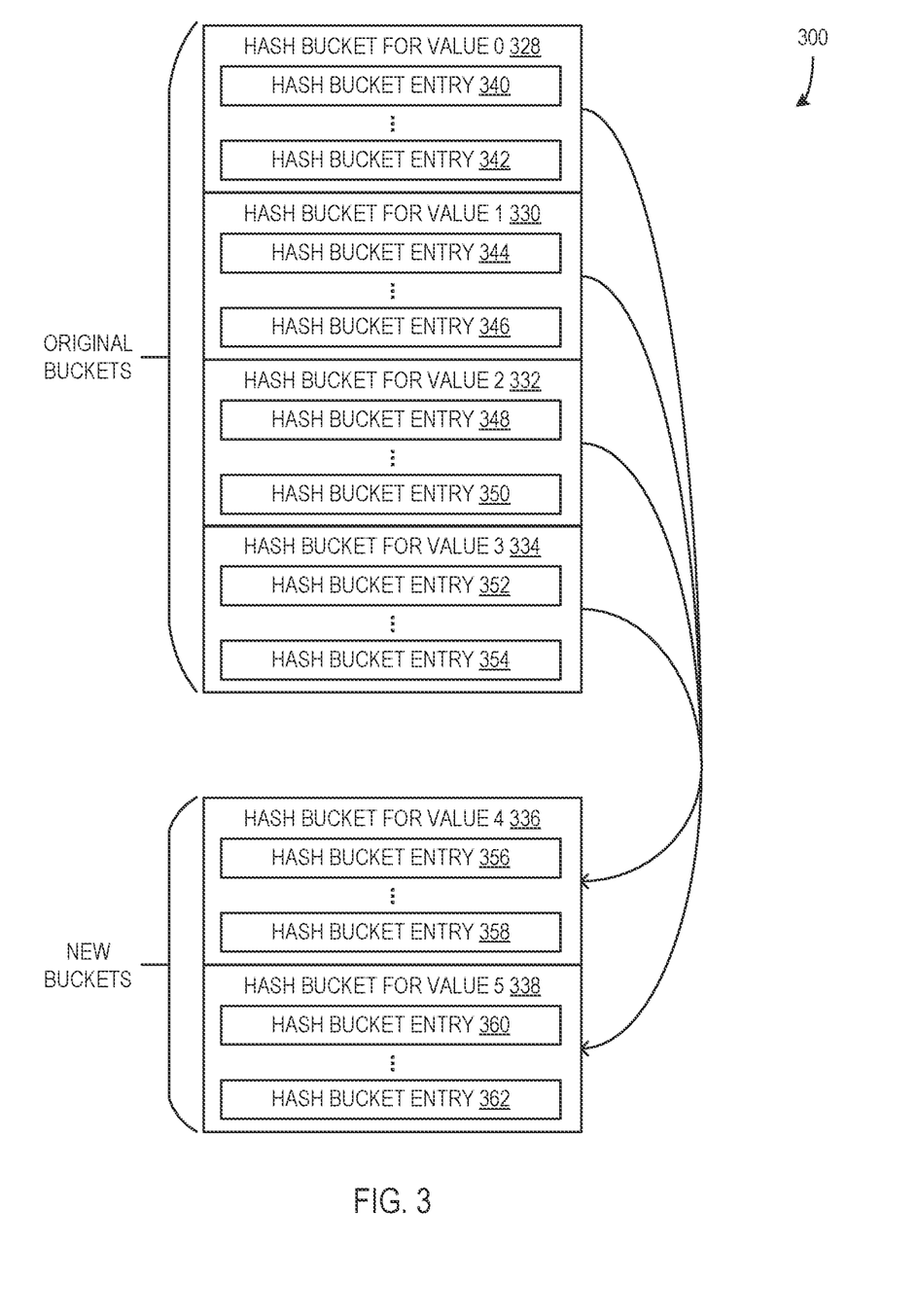
FIG. 3 is a block diagram illustrating a system configured for redistributing hash bucket entries into new hash buckets during a hash bucket growth process.

FIG. 3 is a block diagram illustrating a system 300 configured for redistributing hash bucket entries 340-354 into new hash buckets 336-338 during a hash bucket growth process. This process is also known as 'rehashing' the hash bucket entries 340-354. In some examples, the system 300 is part of or otherwise associated with a system such as system 100 of FIG. 1.

The system 300 includes original hash buckets 328-334. The hash buckets 328-334 are a data structure that provides access to data objects or other entries based on a key, such as a unique string or number value. The hash buckets use a hash function to compute a hash value for use as an index when determining a hash bucket in which to store the key of the data entry. These hash value indexes can be used to efficiently find entries in the hash buckets when the hash buckets are filled with large quantities of data entries. In some examples, a hash bucket entry includes the hash value that is used as the index of the entry within the hash buckets and a value that points to a location in the data cache in which the associated data object or entry is stored. Thus, the hash buckets can be used to efficiently locate data objects in the data cache even if the data buffer of the data cache is not sorted in a manner that enables efficient finding of data entries therein.

Further, the hash buckets 328-334 are configured in such a way that hash values of hash bucket entries 340-354 are approximately evenly spread among the hash buckets 328-334. For instance, in the illustrated example of FIG. 3, the hash bucket entries 340-354 are sorted between the four hash buckets 328-334 based on the result of the hash value modulo four, or the remainder value of dividing the hash value by four. It should be understood that the value four is used in this example because there are four original hash buckets 328-334. In other examples where a different quantity of hash buckets is used, a matching value may be used in the modulo formula to sort the hash bucket entries.

In some examples, when adding a hash bucket entry to the hash buckets 328-334, the result of the hash value modulo four is calculated and that value is used to determine in which hash bucket the hash bucket entry is placed. If the result is zero, the hash bucket entry is placed in the hash bucket for value zero 328; if the result is one, the hash bucket entry is placed in the hash bucket for value one 330; if the result is two, the hash bucket entry is placed in the hash bucket for value two 332; and if the result is three, the hash bucket entry is placed in the hash bucket for value three 334.

Further, in some examples, when the hash buckets of the system 300 are expanded during a growth operation, one or more new hash buckets are created, and the hash bucket entries are rehashed to spread across the original buckets and the new buckets in an approximately even manner. As illustrated, two new hash buckets 336-338 are generated. The new hash bucket 336 is associated with a modulo result value of four and the new hash bucket 338 is associated with a modulo result value of five. The result of adding new hash buckets is that the hash bucket entries 340-354 in the original buckets must be rehashed across those new buckets. In some examples, the process of rehashing a hash bucket entry includes calculating the result of the hash value module six (the new quantity of hash buckets) and using the new result to determine the hash bucket in which the hash bucket entry should be stored. In some cases, the hash bucket entry does not move hash buckets, and, in other cases, the hash bucket entry is moved to another hash bucket of the new set of hash buckets. For example, the hash bucket entry is copied to the determined destination hash bucket and then the hash bucket entry is deleted from the source hash bucket.

It should be understood that, in some examples, some hash bucket entries from an original hash bucket (e.g., hash bucket entries 340-342 in hash bucket 328) are rehashed to a new hash bucket, such that the rehashed hash bucket entries become part of the new hash bucket (e.g., the rehashed hash bucket entries become part of hash bucket entries 356-358 of hash bucket 336). Additionally, or alternatively, some hash bucket entries of hash bucket entries 340-342 are rehashed to be stored in other buckets of the new buckets (e.g., as hash bucket entries 360-362 in hash bucket 338) and/or other buckets of the original buckets (e.g., hash buckets 330-334). Further, it should be understood that, during rehashing hash bucket entries, some entries from hash bucket entries 344-346 are rehashed to the new buckets 336-338 and/or other original buckets 328, 332, and 334; some entries from hash bucket entries 348-350 are rehashed to new buckets 336-338 and/or other original buckets 328, 330, and 334; and/or some entries from hash bucket entries 352-354 are rehashed to new buckets 336-338 and/or other original buckets 328, 330, and 332.

In some examples, the quantity of hash bucket entries in each hash bucket is monitored. In examples where the quantity of hash bucket entries in one or more of the hash buckets exceeds a defined threshold, a growth operation (e.g., a cache growth operation 106) for the hash buckets is triggered, causing one or more additional hash buckets to be created and for the hash bucket entries to be rehashed as described herein. Such hash bucket thresholds are defined based on performance metrics associated with finding entries in the hash buckets. For example, as the quantity of hash entry values in the hash buckets grows, the time taken to locate specific hash bucket entries in the hash buckets increases.

Figure 4:
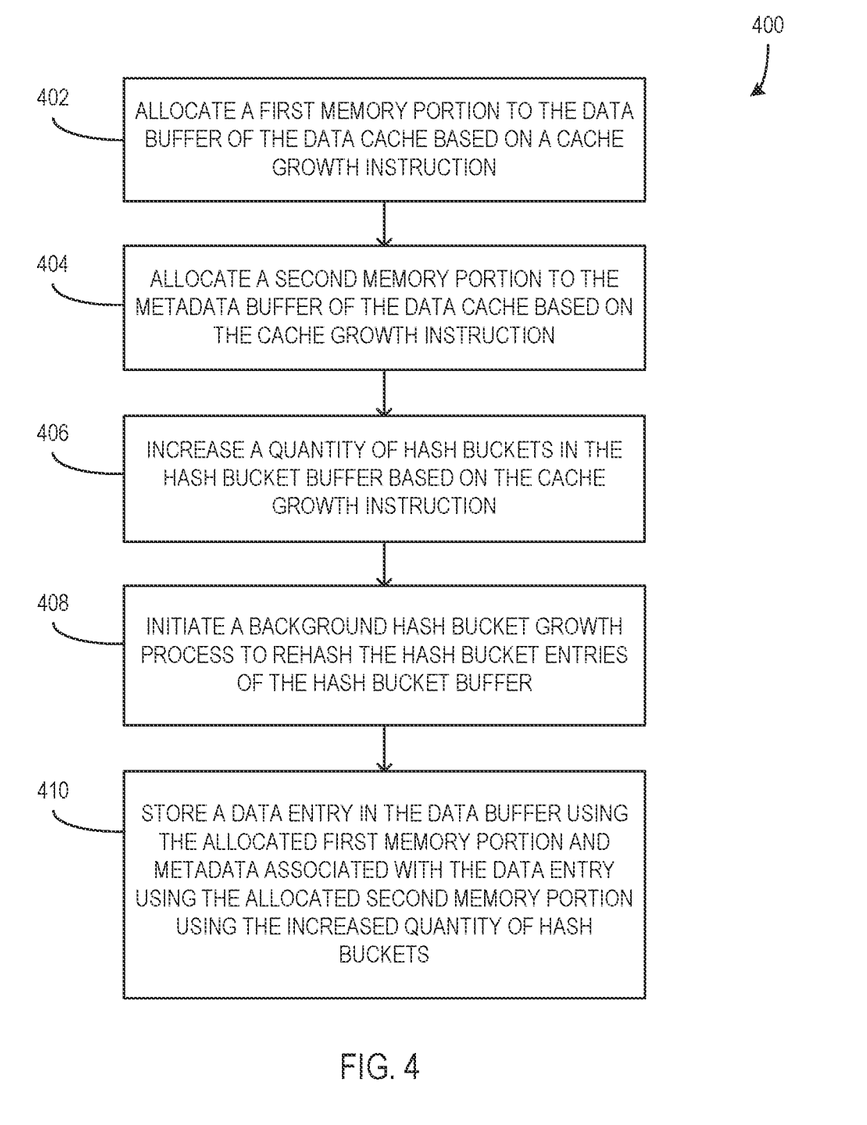
FIG. 4 is a flowchart illustrating a method for growing a data cache using a background hash bucket growth process.

FIG. 4 is a flowchart illustrating a method 400 for growing a data cache (e.g., data cache 102) using a background hash bucket growth process (e.g., process 116). In some examples, the method 400 is executed or otherwise performed in a system such as system 100 of FIG. 1.

At 402, a first memory portion is allocated to the data buffer of the data cache based on a cache growth instruction. In some examples, the first memory portion (e.g., one or more memory pages) is configured to include a block of consecutive addresses of address space that is assigned to the data buffer. Further, in some examples, the address space assigned to the data buffer is a large block of consecutive addresses that is sized in such a way that growth of the data buffer can be performed with reduced or eliminated need to migrate data of the data buffer.

Additionally, or alternatively, in some examples, the cache growth instruction is initiated or otherwise triggered by a threshold of the data cache being exceeded For example, the threshold is associated with the used capacity of the data buffer, associated with the used capacity of the metadata buffer, and/or a associated with the used capacity of hash buckets of the metadata buffer. In other examples, the cache growth instruction is initiated or otherwise triggered manually by a user of the system. In still other examples, the cache growth instruction is initiated or otherwise triggered by other sources or actions without departing from the description.

At 404, a second memory portion is allocated to the metadata buffer of the data cache based on the cache growth instruction. In some examples, the second memory portion (e.g., one or more memory pages) is configured to include a block of consecutive addresses of address space that is assigned to the metadata buffer. Further, in some examples, the address space assigned to the metadata buffer is a large block of consecutive addresses that is sized in such a way that growth of the metadata buffer can be performed with reduced or eliminated need to migrate data of the metadata buffer. Further, it should be understood that, in some such examples, the address space assigned to the metadata buffer does not overlap with the address space assigned to the data buffer.

In some examples, the size of the allocated second memory portion is based at least in part on the size of the allocated first memory portion. For instance, where the allocated first memory portion is of a size to store 1000 new data entries in the data cache, the allocated second memory portion is sized to store the metadata of those potential 1000 new data entries.

At 406, the quantity of hash buckets in the hash bucket buffer of the metadata buffer is increased based on the cache growth instruction. In some examples, the quantity of entries in one or more of the current hash buckets of the hash bucket buffer exceeds a threshold (e.g., a threshold based on performance as described herein) and, as a result, the quantity of hash buckets is increased by at least one hash bucket. Further, in some examples, the quantity by which the hash buckets are increased is based at least in part on the size of the newly allocated memory portions, such that there is sufficient capacity in the hash buckets to store hash bucket entries for any new data entries stored in the newly allocated memory portions.

At 408, a background hash bucket growth process is initiated to rehash the hash bucket entries of the hash bucket buffer. Because the hash bucket data structure is configured to operate with substantially even or equal quantities of entries in each hash bucket, at least some of the hash bucket entries in the original or current hash buckets are reorganized and/or migrated to other hash buckets, including the hash buckets created as a result of the cache growth operation. The background hash bucket growth process is executed or otherwise performed on other processing hardware and/or using other processing thread(s) than the process of method 400 and/or other processes that interact with the data cache such that the rehashing of the hash bucket entries does not substantially interfere with those other processes. The rehashing operations and/or processes are described in greater detail below with respect to FIG. 5.

At 410, a data entry is stored in the data buffer using the allocated first memory portion and the metadata associated with the data entry is stored using the allocated second memory portion. Further, a portion of the metadata includes a hash bucket entry that is placed and/or stored in a hash bucket of the increased quantity of hash buckets in the hash bucket buffer of the metadata buffer. In some examples, the storing of the data entry is performed in parallel with the operations of the initiated background hash bucket growth process. Alternatively, in other examples, the storing of the data entry is performed after the background hash bucket growth process has completed the rehashing of the hash bucket entries of the hash bucket buffer. Further, in some examples, other operations are performed on the data cache, such as the operation described below with respect to FIG. 6, without departing from the description.

Figure 5:
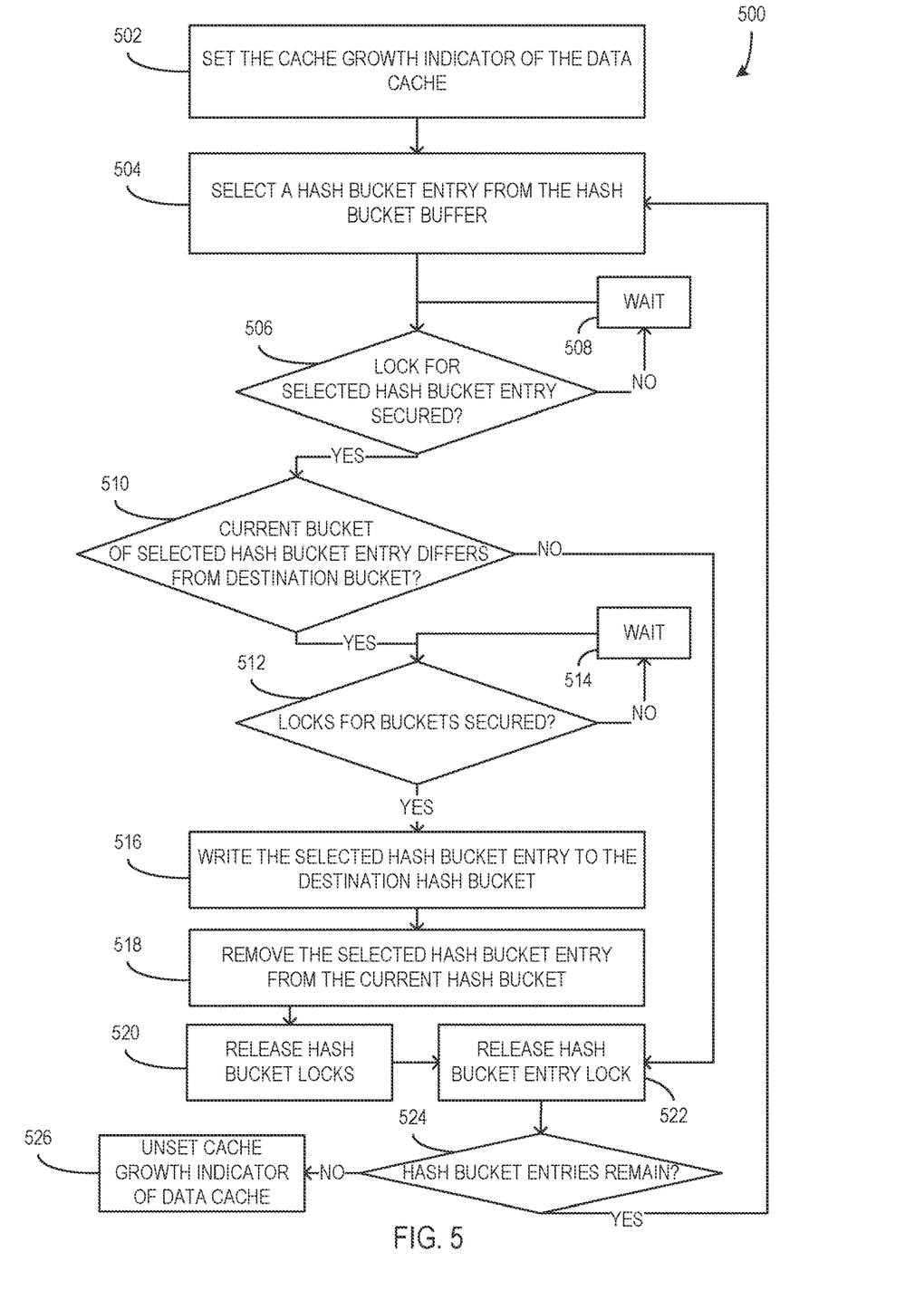
FIG. 5 is a flowchart illustrating a method for growing a hash bucket buffer by a background hash bucket growth process.

FIG. 5 is a flowchart illustrating a method 500 for growing a hash bucket buffer (e.g., hash buckets 112) by a background hash bucket growth process (e.g., process 116). In some examples, the method 500 is executed or otherwise performed in a system such as system 100 of FIG. 1.

At 502, the cache growth indicator of the data cache is set. In some examples, the cache growth indicator being set indicates that the data cache is currently being grown and/or that a background hash bucket growth process has been initiated and is being executed.

At 504, a hash bucket entry is selected from the hash bucket buffer. In some examples, selecting the hash bucket entry includes selecting an entry that has not been selected during the performance of the method 500. Further, in some examples, selecting the hash bucket entry includes selecting a hash bucket entry in an order based on a previously selected hash bucket entry. In an example, the hash bucket entries are selected in an order in which they are stored in the hash buckets.

At 506, the process attempts to secure a lock for the selected hash bucket entry. If the lock is secured, the process proceeds to 510. Alternatively, if the lock is not secured, the process proceeds to 508. At 508, the process waits for a period of time and then returns to 506, where the process attempts to secure the lock of the selected hash bucket entry again. In some examples, the period of time that the process waits at 508 is a defined period of time. Additionally, or alternatively, the process is configured to perform other operations while waiting at 508. In an example, the process attempts to rehash a different hash bucket entry while waiting at 508.

At 510, the process determines whether the current bucket of the selected hash bucket entry differs from the destination bucket of the selected hash bucket entry. If the hash buckets of the hash bucket entry are different, the process proceeds to 512. Alternatively, if the hash buckets of the hash bucket entry are the same, the process proceeds to 522 to release the hash bucket entry lock and to determine whether hash bucket entries remain to be selected at 524.

At 512, the process attempts to secure the locks for the current bucket and the destination bucket of the selected hash bucket entry. If the bucket locks are secured, the process proceeds to 516. Alternatively, if the bucket locks are not secured, the process proceeds to 514. At 514, the process waits for a period of time and then returns to 512 to reattempt to secure the bucket locks.

At 516, the selected hash bucket entry is written to the destination hash bucket and, at 518, the selected hash bucket entry is removed from the current hash bucket.

At 520, the hash bucket locks are released and, at 522, the hash bucket entry lock is released.

At 524, if hash bucket entries remain to be rehashed, the process returns to 504 to select another hash bucket entry. Alternatively, if no hash bucket entries remain to be rehashed, the process proceeds to 526. At 526, the cache growth indicator of the data cache is unset, such that the indicator indicates that the data cache is not being grown and/or that a background hash bucket growth process is not active. The cache growth indicator is used by other processes that interact with the data cache to determine how to synchronize the process with the current state of the data cache (e.g., determining how to secure locks prior to performing operations) as described below with respect to FIG. 6.

Figure 6:
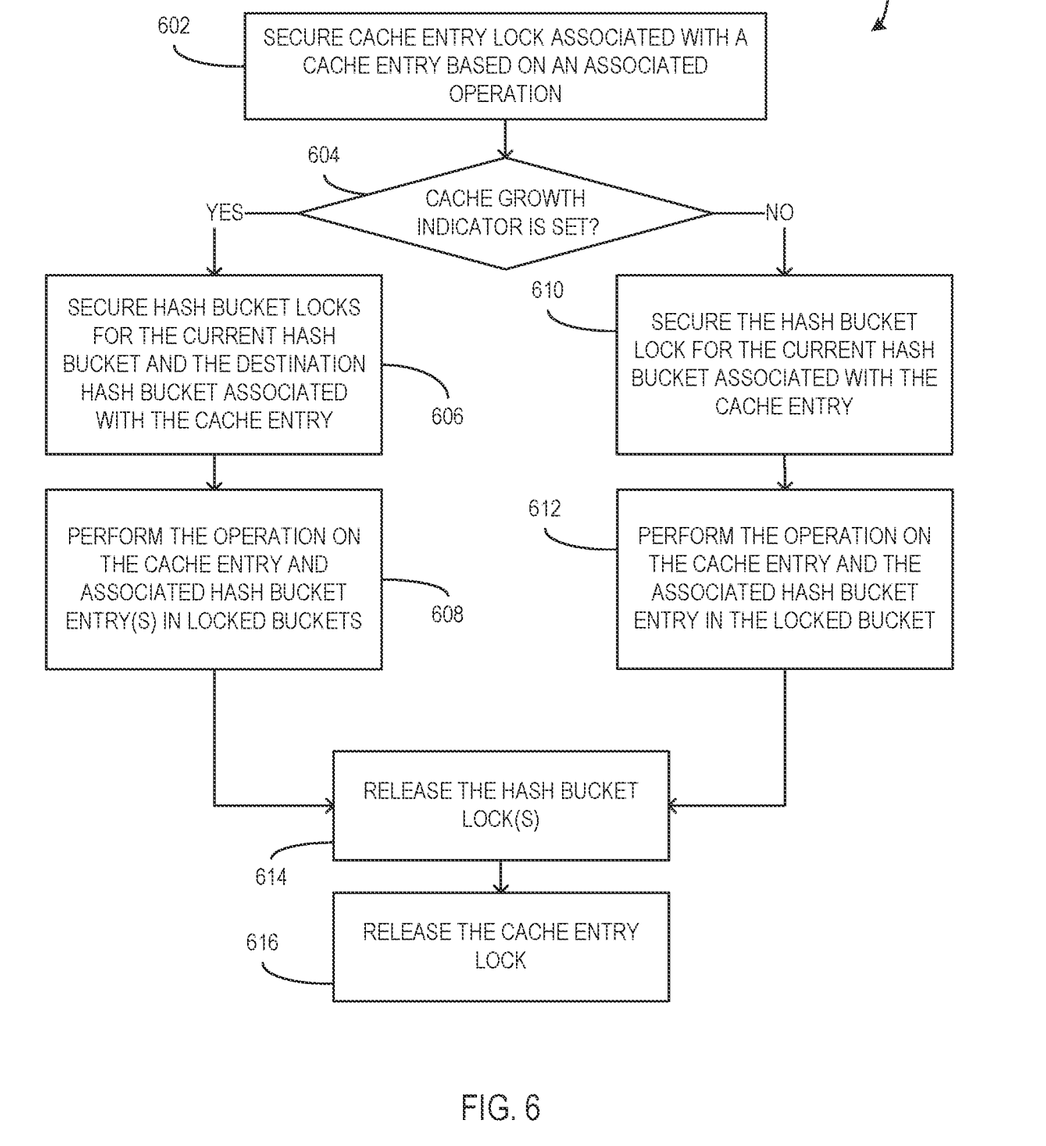
FIG. 6 is a flowchart illustrating a method for performing operations in a data cache while the data cache is being grown using a background process.

FIG. 6 is a flowchart illustrating a method 600 for performing operations (e.g., operations 108) in a data cache (e.g., data cache 102) while the data cache is being grown using a background process (e.g., a process 116). In some examples, the method 600 is executed or otherwise performed in a system such as system 100 of FIG. 1.

At 602, a cache entry lock of a cache entry is secured based on an operation that is to be performed in association with the cache entry. For instance, in an example, the operation is one of an operation to write to and/or otherwise change the cache entry or an operation to delete the cache entry. In some examples, the cache entry is a data entry stored in a data buffer 114 of a data cache 102 and that is associated with a hash bucket entry in a hash bucket 112 of a metadata buffer 110 of the data cache 102, such that the hash bucket entry includes location data indicative of the location of the data entry within the data buffer 114, as described herein.

At 604, if the cache growth indicator of the data cache is set, the process proceeds to 606. Alternatively, if the cache growth indicator is not set, the process proceeds to 610. In some examples, the cache growth indicator being set indicates that the data cache is currently being grown and/or that a background hash bucket growth process is being performed as described herein.

At 606, the bucket locks for the current hash bucket and the destination hash bucket of a hash bucket entry associated with the cache entry are secured. At 608, after the locks are secured, the operation is performed on the cache entry and/or the associated hash bucket entry in the locked buckets. The process then proceeds to 614.

At 610, the bucket lock for the current hash bucket of the hash bucket entry associated with the cache entry is secured. At 612, after the lock of the current hash bucket is secured, the operation is performed on the cache entry and/or the associated hash bucket entry in the locked bucket. The process then proceeds to 614.

It should be understood that, when the cache growth indicator is set and it is possible that a background process is executing to rehash hash bucket entries, the process is configured to secure locks for both hash buckets of the hash bucket entry to ensure synchronization of any changes made during performance of the operation. Alternatively, if the cache growth indicator is not set, the process is configured to secure just the lock for the current hash bucket, as no rehashing of the hash bucket entry to a different bucket is imminent and the single lock is sufficient to ensure synchronization of any changes made during the performance of the operation.

At 614, the hash bucket lock(s) are released and, at 616, the cache entry lock is released. In some examples, the securing and releasing of locks always occurs in this order, such that a hash bucket lock is never secured if an associated cache entry lock is not already secured and, similarly, a cache entry lock is never released unless all associated hash bucket locks have already been released.

Alternatively, or additionally, in some examples, when securing of a lock is attempted, the attempt fails due to the lock being currently secured by another entity. In some such examples, the process determines that the lock is already secured by the other entity and, as a result, the process releases any locks that it has already secured. Then, the process reschedules the performance of the operation, such that securing the necessary locks is tried again at a later time.

Exemplary Operating Environment

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, growing a data cache using assigned address space blocks per buffer and a background hash bucket growth process as described herein is accomplished by software, hardware, and/or firmware.

In some examples, computer executable instructions are provided using any computer-readable media that are accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receive output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises: a processor; and a memory comprising computer program code, the memory and the computer program code configured to, with the processor, cause the processor to: allocate a first memory portion to a data buffer of a data cache based at least in part on a cache growth instruction, wherein the first memory portion is configured to include a portion of address space associated with the data buffer; allocate a second memory portion to a metadata buffer of the data cache associated with the data buffer based at least in part on the cache growth instruction, wherein the second memory portion is configured to include a portion of address space associated with a metadata buffer associated with the data cache; increase a quantity of hash buckets in a hash bucket buffer of the metadata buffer based at least in part on the cache growth instruction; initiate a background hash bucket growth process configured to rehash at least a portion of hash bucket entries of the hash bucket buffer in the increased quantity of hash buckets; and store a data entry in the data buffer using the allocated first memory portion of the data cache and metadata associated with the data entry using the allocated second memory portion of the metadata buffer, wherein a hash bucket entry associated with the data entry is stored in the increased quantity of hash buckets in the hash bucket buffer.

An example computerized method comprises: allocating a first memory portion to a data buffer of a data cache based at least in part on a cache growth instruction, wherein the first memory portion is configured to include a portion of address space associated with the data buffer; allocating a second memory portion to a metadata buffer of the data cache associated with the data buffer based at least in part on the cache growth instruction, wherein the second memory portion is configured to include a portion of address space associated with a metadata buffer associated with the data cache; increasing a quantity of hash buckets in a hash bucket buffer of the metadata buffer based at least in part on the cache growth instruction; initiating a background hash bucket growth process configured to rehash at least a portion of hash bucket entries of the hash bucket buffer in the increased quantity of hash buckets; and storing a data entry in the data buffer using the allocated first memory portion of the data cache and metadata associated with the data entry using the allocated second memory portion of the metadata buffer, wherein a hash bucket entry associated with the data entry is stored in the increased quantity of hash buckets in the hash bucket buffer.

One or more computer storage media have computer-executable instructions that, upon execution by a processor, cause the processor to at least: allocate a first memory portion to a data buffer of a data cache based at least in part on a cache growth instruction, wherein the first memory portion is configured to include a portion of address space associated with the data buffer; allocate a second memory portion to a metadata buffer of the data cache associated with the data buffer based at least in part on the cache growth instruction, wherein the second memory portion is configured to include a portion of address space associated with a metadata buffer associated with the data cache; increase a quantity of hash buckets in a hash bucket buffer of the metadata buffer based at least in part on the cache growth instruction; initiate a background hash bucket growth process configured to rehash at least a portion of hash bucket entries of the hash bucket buffer in the increased quantity of hash buckets; and store a data entry in the data buffer using the allocated first memory portion of the data cache and metadata associated with the data entry using the allocated second memory portion of the metadata buffer, wherein a hash bucket entry associated with the data entry is stored in the increased quantity of hash buckets in the hash bucket buffer.

Alternatively, or in addition to the other examples described herein, examples include any combination of the following:
  wherein rehashing at least a portion of hash bucket entries by the background hash bucket growth process includes: setting a cache growth indicator of the data cache to indicate that the data cache is being grown; for each hash bucket entry: securing an entry lock of the hash bucket entry; determining a current hash bucket of the hash bucket entry and a destination hash bucket of the hash bucket entry based at least in part on the increased quantity of hash buckets; based at least in part on the determined current hash bucket and destination hash bucket of the hash bucket entry being different hash buckets, rehashing the hash bucket entry; releasing the entry lock of the hash bucket entry; and setting the cache growth indicator of the data cache to indicate that the data cache is not being grown.
  wherein the rehashing of the hash bucket entry includes: securing hash bucket locks of the determined current hash bucket and destination hash bucket; writing the hash bucket entry to the determined destination hash bucket; removing the hash bucket entry from the determined current hash bucket; and releasing the hash bucket locks of the determined current hash bucket and destination hash bucket.
  further comprising: securing a cache entry lock associated with a cache entry of the data cache based at least in part on an operation associated with the cache entry; determining that a cache growth indicator of the data cache indicates that the data cache is being grown; securing hash bucket locks for a current hash bucket and a destination hash bucket associated with a hash bucket entry of the cache entry; performing the operation, wherein the operation updates at least one of the cache entry and the hash bucket entry of the cache entry; releasing the hash bucket locks of the current hash bucket and the destination hash bucket associated with the hash bucket entry of the cache entry; and releasing the cache entry lock.
  wherein the address space associated with the data cache includes a first block of consecutive addresses and the first memory portion is configured to include an unused address of the first block of consecutive addresses that immediately follows a used address of the first block of consecutive addresses that has a highest address value of a set of used addresses of the first block of consecutive addresses; wherein the address space associated with the metadata buffer includes a second block of consecutive addresses and the second memory portion is configured to include an unused address of the second block of consecutive addresses that immediately follows a used address of the second block of consecutive addresses that has a highest address value of a set of used addresses of the first block of consecutive addresses; and wherein the first block of consecutive addresses and the second block of consecutive addresses are non-overlapping.
  further comprising: securing a cache entry lock associated with a cache entry of the data cache based at least in part on an operation associated with the cache entry; determining that a hash bucket lock for a current hash bucket associated with a hash bucket entry of the cache entry is secured by another entity; releasing the secured cache entry lock associated with the cache entry; and rescheduling performance of the operation associated with the cache entry.
  wherein the cache growth instruction is triggered based on at least one of the following: a used capacity of the data buffer reaching a data buffer threshold, a used capacity of the metadata buffer reaching a metadata buffer threshold, and a used capacity of at least one hash bucket of the hash bucket buffer reaching a hash bucket threshold.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for allocating a first memory portion to a data buffer of a data cache based at least in part on a cache growth instruction, wherein the first memory portion is configured to include a portion of address space associated with the data buffer; exemplary means for allocating a second memory portion to a metadata buffer of the data cache associated with the data buffer based at least in part on the cache growth instruction, wherein the second memory portion is configured to include a portion of address space associated with a metadata buffer associated with the data cache; exemplary means for increasing a quantity of hash buckets in a hash bucket buffer of the metadata buffer based at least in part on the cache growth instruction; exemplary means for initiating a background hash bucket growth process configured to rehash at least a portion of hash bucket entries of the hash bucket buffer in the increased quantity of hash buckets; and exemplary means for storing a data entry in the data buffer using the allocated first memory portion of the data cache and metadata associated with the data entry using the allocated second memory portion of the metadata buffer, wherein a hash bucket entry associated with the data entry is stored in the increased quantity of hash buckets in the hash bucket buffer.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
   a processor; and
   a memory comprising computer program code, the memory and the computer program code configured to, with the processor, cause the processor to:
      allocate a first memory portion to a data buffer of a data cache, wherein the first memory portion is configured to include a portion of address space associated with the data buffer;
      allocate a second memory portion to a metadata buffer of the data cache associated with the data buffer, wherein the second memory portion is configured to include a portion of address space associated with a metadata buffer associated with the data cache;
      increase a quantity of hash buckets in a hash bucket buffer of the metadata buffer;
      secure a cache entry lock associated with a cache entry of the data cache based at least in part on an operation associated with the cache entry;
      determine that a cache growth indicator of the data cache indicates that the data cache is being grown;
      secure hash bucket locks for a current hash bucket and a destination hash bucket associated with a hash bucket entry of the cache entry;
      initiate a background hash bucket growth process configured to rehash at least a portion of hash bucket entries of the hash bucket buffer in the increased quantity of hash buckets;
      perform the operation, wherein the operation updates at least one of the cache entry and the hash bucket entry of the cache entry;
      release the hash bucket locks of the current hash bucket and the destination hash bucket associated with the hash bucket entry of the cache entry; and
      release the cache entry lock; and
      store a data entry in the data buffer using the allocated first memory portion of the data cache and metadata associated with the data entry using the allocated second memory portion of the metadata buffer, wherein a hash bucket entry associated with the data entry is stored in the increased quantity of hash buckets in the hash bucket buffer.

2. The system of claim 1, wherein rehashing at least a portion of hash bucket entries by the background hash bucket growth process includes:
   for each hash bucket entry:
      securing an entry lock of the hash bucket entry;
      determining a current hash bucket of the hash bucket entry and a destination hash bucket of the hash bucket entry based at least in part on the increased quantity of hash buckets;
      based at least in part on the determined current hash bucket and destination hash bucket of the hash bucket entry being different hash buckets, rehashing the hash bucket entry;
      releasing the entry lock of the hash bucket entry; and
      setting the cache growth indicator of the data cache to indicate that the data cache is not being grown.

3. The system of claim 2, wherein the rehashing of the hash bucket entry includes:
   securing hash bucket locks of the determined current hash bucket and destination hash bucket;
   writing the hash bucket entry to the determined destination hash bucket;

removing the hash bucket entry from the determined current hash bucket; and releasing the hash bucket locks of the determined current hash bucket and destination hash bucket.

4. The system of claim 1, wherein the address space associated with the data cache includes a first block of consecutive addresses and the first memory portion is configured to include an unused address of the first block of consecutive addresses that immediately follows a used address of the first block of consecutive addresses that has a highest address value of a set of used addresses of the first block of consecutive addresses;

wherein the address space associated with the metadata buffer includes a second block of consecutive addresses and the second memory portion is configured to include an unused address of the second block of consecutive addresses that immediately follows a used address of the second block of consecutive addresses that has a highest address value of a set of used addresses of the first block of consecutive addresses; and wherein the first block of consecutive addresses and the second block of consecutive addresses are non-overlapping.

5. The system of claim 1, wherein the memory and the computer program code are configured to, with the processor, further cause the processor to:

determine that the hash bucket lock for the current hash bucket is secured by another entity;

release the secured cache entry lock associated with the cache entry; and reschedule performance of the operation associated with the cache entry.

6. The system of claim 1, wherein the cache growth instruction is triggered based on at least one of the following: a used capacity of the data buffer reaching a data buffer threshold, a used capacity of the metadata buffer reaching a metadata buffer threshold, and a used capacity of at least one hash bucket of the hash bucket buffer reaching a hash bucket threshold.

7. A computerized method comprising:

allocating a first memory portion to a data buffer of a data cache, wherein the first memory portion is configured to include a portion of address space associated with the data buffer;

allocating a second memory portion to a metadata buffer of the data cache associated with the data buffer, wherein the second memory portion is configured to include a portion of address space associated with a metadata buffer associated with the data cache;

increasing a quantity of hash buckets in a hash bucket buffer of the metadata buffer;

securing a cache entry lock associated with a cache entry of the data cache based at least in part on an operation associated with the cache entry;

determining that a cache growth indicator of the data cache indicates that the data cache is being grown;

securing hash bucket locks for a current hash bucket and a destination hash bucket associated with a hash bucket entry of the cache entry;

initiating a background hash bucket growth process configured to rehash at least a portion of hash bucket entries of the hash bucket buffer in the increased quantity of hash buckets;

performing the operation, wherein the operation updates at least one of the cache entry and the hash bucket entry of the cache entry;

releasing the hash bucket locks of the current hash bucket and the destination hash bucket associated with the hash bucket entry of the cache entry;

releasing the cache entry lock; and storing a data entry in the data buffer using the allocated first memory portion of the data cache and metadata associated with the data entry using the allocated second memory portion of the metadata buffer, wherein a second hash bucket entry associated with the data entry is stored in the increased quantity of hash buckets in the hash bucket buffer.

8. The computerized method of claim 7, wherein rehashing at least a portion of hash bucket entries by the background hash bucket growth process includes:

setting the cache growth indicator of the data cache to indicate that the data cache is being grown;

for each hash bucket entry:

securing an entry lock of the hash bucket entry;

determining a current hash bucket of the hash bucket entry and a destination hash bucket of the hash bucket entry based at least in part on the increased quantity of hash buckets;

based at least in part on the determined current hash bucket and destination hash bucket of the hash bucket entry being different hash buckets, rehashing the hash bucket entry;

releasing the entry lock of the hash bucket entry; and setting the cache growth indicator of the data cache to indicate that the data cache is not being grown.

9. The computerized method of claim 8, wherein the rehashing of the hash bucket entry includes:

securing hash bucket locks of the determined current hash bucket and destination hash bucket;

writing the hash bucket entry to the determined destination hash bucket;

removing the hash bucket entry from the determined current hash bucket; and releasing the hash bucket locks of the determined current hash bucket and destination hash bucket.

10. The computerized method of claim 7, wherein the address space associated with the data cache includes a first block of consecutive addresses and the first memory portion is configured to include an unused address of the first block of consecutive addresses that immediately follows a used address of the first block of consecutive addresses that has a highest address value of a set of used addresses of the first block of consecutive addresses; and wherein the address space associated with the metadata buffer includes a second block of consecutive addresses and the second memory portion is configured to include an unused address of the second block of consecutive addresses that immediately follows a used address of the second block of consecutive addresses that has a highest address value of a set of used addresses of the second block of consecutive addresses; and wherein the first block of consecutive addresses and the second block of consecutive addresses are non-overlapping.

11. The computerized method of claim 7, further comprising:

determining that the hash bucket lock for the current hash bucket is secured by another entity;

releasing the secured cache entry lock associated with the cache entry; and rescheduling performance of the operation associated with the cache entry.

12. The computerized method of claim 7, wherein the cache growth instruction is triggered based on at least one of the following: a used capacity of the data buffer reaching a data buffer threshold, a used capacity of the metadata buffer reaching a metadata buffer threshold, and a used capacity of at least one hash bucket of the hash bucket buffer reaching a hash bucket threshold.

13. One or more computer storage media having computer-executable instructions that, upon execution by a processor, cause the processor to at least:
   allocate a first memory portion to a data buffer of a data cache, wherein the first memory portion is configured to include a portion of address space associated with the data buffer;
   allocate a second memory portion to a metadata buffer of the data cache associated with the data buffer, wherein the second memory portion is configured to include a portion of address space associated with a metadata buffer associated with the data cache;
   increase a quantity of hash buckets in a hash bucket buffer of the metadata buffer;
   secure a cache entry lock associated with a cache entry of the data cache based at least in part on an operation associated with the cache entry;
   determine that a cache growth indicator of the data cache indicates that the data cache is being grown;
   secure hash bucket locks for a current hash bucket and a destination hash bucket associated with a hash bucket entry of the cache entry;
   initiate a background hash bucket growth process configured to rehash at least a portion of hash bucket entries of the hash bucket buffer in the increased quantity of hash buckets;
   perform the operation, wherein the operation updates at least one of the cache entry and the hash bucket entry of the cache entry;
   release the hash bucket locks of the current hash bucket and the destination hash bucket associated with the hash bucket entry of the cache entry;
   release the cache entry lock; and
   store a data entry in the data buffer using the allocated first memory portion of the data cache and metadata associated with the data entry using the allocated second memory portion of the metadata buffer, wherein a hash bucket entry associated with the data entry is stored in the increased quantity of hash buckets in the hash bucket buffer.

14. The one or more computer storage media of claim 13, wherein rehashing at least a portion of hash bucket entries by the background hash bucket growth process includes:
   setting the cache growth indicator of the data cache to indicate that the data cache is being grown;
   for each hash bucket entry:
      securing an entry lock of the hash bucket entry;
      determining a current hash bucket of the hash bucket entry and a destination hash bucket of the hash bucket entry based at least in part on the increased quantity of hash buckets;
      based at least in part on the determined current hash bucket and destination hash bucket of the hash bucket entry being different hash buckets, rehashing the hash bucket entry;
      releasing the entry lock of the hash bucket entry; and
   setting the cache growth indicator of the data cache to indicate that the data cache is not being grown.

15. The one or more computer storage media of claim 14, wherein the rehashing of the hash bucket entry includes:
   securing hash bucket locks of the determined current hash bucket and destination hash bucket;
   writing the hash bucket entry to the determined destination hash bucket;
   removing the hash bucket entry from the determined current hash bucket; and
   releasing the hash bucket locks of the determined current hash bucket and destination hash bucket.

16. The one or more computer storage media of claim 13, wherein the address space associated with the data cache includes a first block of consecutive addresses and the first memory portion is configured to include an unused address of the first block of consecutive addresses that immediately follows a used address of the first block of consecutive addresses that has a highest address value of a set of used addresses of the first block of consecutive addresses;
   wherein the address space associated with the metadata buffer includes a second block of consecutive addresses and the second memory portion is configured to include an unused address of the second block of consecutive addresses that immediately follows a used address of the second block of consecutive addresses that has a highest address value of a set of used addresses of the first block of consecutive addresses; and
   wherein the first block of consecutive addresses and the second block of consecutive addresses are non-overlapping.

17. The one or more computer storage media of claim 13, wherein the computer-executable instructions, upon execution by a processor, further cause the processor to at least:
   determine that the hash bucket lock for the current hash bucket is secured by another entity;
   release the secured cache entry lock associated with the cache entry; and
   reschedule performance of the operation associated with the cache entry.

18. The one or more computer storage media of claim 13, wherein the cache growth instruction is triggered based on at least one of the following: a used capacity of the data buffer reaching a data buffer threshold, a used capacity of the metadata buffer reaching a metadata buffer threshold, and a used capacity of at least one hash bucket of the hash bucket buffer reaching a hash bucket threshold.

* * * * *